United States Patent Office 3,140,275
Patented July 7, 1964

3,140,275
PROCESS FOR POLYMERIZING BICYCLO-[2.2.1]-2,5-HEPTADIENES
William W. Spooncer, Richmond, Calif., assignor to Shell Oil Company, New York, N.Y., a corporation of Delaware
No Drawing. Filed June 7, 1961, Ser. No. 115,291
11 Claims. (Cl. 260—86.7)

This invention relates to the polymerization of unsaturated monomers. More particularly, the invention relates to a new process for polymerizing bicyclo-[2.2.1]-2,5-heptadienes using high energy ionizing radiation, to soluble thermoplastic polymers prepared thereby and to the utilization of these polymers.

Specifically, the invention provides novel soluble thermoplastic saturated polymers of a bicyclo-[2.2.1]-2,5-heptadiene prepared by a process which comprises exposing the diene monomer in condensed phase to high energy ionizing radiation of substantial penetrating power. The invention further provides a process for the preparation of these novel polymers.

Polymers of the bicyclo-[2.2.1]-2,5-heptadienes prepared in the presence of Ziegler catalysts or by free radical polymerization are unstable low molecular weight viscous materials which are unsaturated and prone to cross-linking. These unsaturated polymers are unsuitable for many applications, because the double bond is amenable to attack and degradation as by oxidation to form insoluble polymers.

It is an object of this invention, therefore, to provide new and useful thermoplastic polymers. It is another object to provide saturated polymers of polyunsaturated monomers. It is another object to provide new and stable polymers which are particularly useful as molding compositions. It is another object to provide soluble polymers which are particularly suitable as surface coatings. It is another object to provide polymers which have high temperature resistance. It is a further object to provide a new process for polymerizing unsaturated monomers. It is a further object to provide a new process for producing soluble polymers. It is a further object to provide a process for polymerizing unsaturated monomers to saturated polymers. These and other objects of the invention will be apparent from the following detailed description thereof.

It has now been discovered that these and other objects may be accomplished by the novel polymer compositions of the present invention which comprises a thermoplastic saturated polymer of a bicyclo-[2.2.1]-2,5-heptadiene having a melting point above 300° C. and soluble in aromatic hydrocarbon solvents. These polymers have been found to have many unusual and beneficial properties. The new polymers, for example, are stable and are particularly suitable for use in surface coatings. It may also be observed that such polymers are thermoplastic and possess high temperature resistance and, therefore, are suitable for use in molding compositions.

The new polymers of the invention are prepared by irradiating the bicyclo-[2.2.1]-2,5-heptadiene monomers with high energy ionizing radiation under oxygen-free conditions. The irradiation of bicyclo-[2.2.1]-2,5-heptadienes (I) under oxygen-free conditions with electrons, X-rays and the like produced polymers consisting of repeating nortricyclene or alkyl-substituted nortricyclene units (II), as follows, wherein R is an alkyl radical or hydrogen:

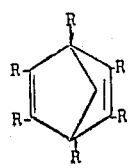   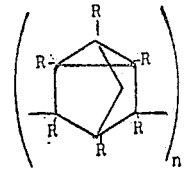

(I)                    (II)

Evidence for such a structure of the polymers is shown by the usual techniques of infrared spectra and correlations as well as nuclear magnetic resonance spectra and correlations. It was found, for example, with IR that the ring system remains substantially intact in the polymer and there are no double bonds present. Also, the cyclopropyl ring was found using IR spectral analysis.

The mechanism of polymerization of the present invention as distinguished from Ziegler polymerization and free-radical polymerization involves an ionic propagation. Such ionic mechanism is evidenced by increased G values of polymerization upon lowering the temperature during X-irradiation and decreased G values of polymerization in the presence of methanol during X-irradiation. G of polymerization is defined as the number of molecules formed per 100 electron volts absorbed. Data showing such ionic mechanism is shown by the following typical data:

| Irradiation Type | Temp., °C. | Addend | G (Polymerization) |
|---|---|---|---|
| Electrons | 20 | none | 60 |
| X-rays | 20 | do | 7–50 |
| Do | −80 | do | 204–380 |
| Do | −80 | 10% methanol | 49 |

The ionic mechanism is further evidenced by constant G values of polymerization with variable dose rates during X-irradiation. The following data illustrate the nondependence of G (polymerization) on dose rates:

| Dose Rate, 10⁶ Rad/hr. | Total Dose, 10⁶ Rad | Temp., °C. | G (Polymerization) |
|---|---|---|---|
| 3.2 | 2.4 | 30 | 44 |
| 0.8 | 0.6 | 30 | 45 |
| 3.2 | 2.4 | −20 | 38 |
| 3.2 | 2.4 | 0–3 | 38 |
| 0.8 | 0.6 | 8–11 | 38 |

The monomers which are suitable for the present invention are the alkyl-substituted bicyclo-[2.2.1]-2,5-heptadienes, and preferably those bicyclo-[2.2.1]-2,5-heptadienes having the general formula

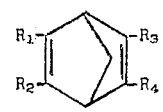

wherein $R_1$, $R_2$, $R_3$ and $R_4$ are hydrogen or alkyl having up to 18 carbon atoms. Preferred monomers to be polymerized by the process of the invention are the bicyclo-

[2.2.1]-2,5-heptadienes, wherein $R_1$ is an alkyl having up to 6 carbon atoms and $R_2$, $R_3$ and $R_4$ are hydrogen atoms. Especially preferred is bicyclo-[2.2.1]-2,5-heptadiene.

The monomers used in the present process should be substanially pure. Purity of at least 95% and preferably 97% is desired.

It is especially important to avoid the presence of molecular oxygen and oxygenated compounds such as, for example, carbon dioxide, ethanol, methanol, acetone, ether, and the like.

The present invention utilizes ionizing radiation which has the power to penetrate to a substantial depth, i.e., at least about 1 cm., into a mass of monomer in condensed phase. This is sometimes referred to herein as radiation of substantial penetrating power. In accordance with this invention, a mass of a bicyclo-[2.2.1]-2,5-heptadiene in condensed phase is exposed to such radiation from a source which is not finely dispersed within said mass. The radiation may be introduced into the condensed mass, held in a vessel, through a suitable window, in the vessel or by placing an intensive source of radiation, such as a canned mass of a gamma-ray emitter, into the vessel containing the monomer. To simplify terminology, such sources which are not finely dispersed within the mass are referred to herein as "external" sources.

The kinds of radiation suitable for use in the present invention include high energy electrons, protons and photons. Electron beams are suitably produced by electron accelerators such as the Van de Graaff, resonance transformers and linear accelerators or by a suitable arrangement of certain isotopes, e.g., strontium 90. High energy photons suitable for use are, for example, X-rays produced by conventional X-ray tubes and electron accelerators and gamma-rays which may be produced by decay of radioactive materials such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons which, being charged, induce ionization and excitation as they pass through the monomer mixture.

The devices suitable for producing beams of electrons, protons, X-rays and fast neutrons are well known in the art and need not be described herein in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the pertinent paper by Burton et al., Nucleonics 13 (No. 10), 74 (1955) and references cited therein.

A preferred process comprises exposing of the monomer mixture to radiation by passing it through a nuclear reactor which may, at the same time, be employed for power producing purposes or may be utilized exclusively for polymerization. A suitable reactor is described in substantial detail in the Fermi et al. patent, U.S. 2,708,656.

The total dosage needed to effect polymerization will vary with the various monomers. Preferred total dosage varies from $10^5$ to $5 \times 10^6$ rads; dosages up to $5 \times 10^8$ rads or more, calculated on the total mixture, may be employed if polymer is removed from the irradiation zone after it is formed. A rad is defined as 100 ergs of ionizing energy absorbed per gram of the irradiated mixture.

The dosage rate will also vary considerably. Preferred dosage rate varies from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The radiation is conducted at a temperature between about $+30°$ C. and $-180°$ C. The radiation is preferably accomplished at temperatures ranging from below $-80°$ C. to $-140°$ C. These temperatures may be obtained by conventional techniques such as use of liquid nitrogen, Dry Ice, boiling ethylene and the like.

The process is conducted in an inert atmosphere, such as helium, or it may be accomplished by use of high vacuum. The molecular oxygen preferably should not be more than $10^{-3}$ mol percent.

When carrying out the process of the invention by means of radiation with a beam of particles, the reaction mixture is preferably contained in a cell constructed of a suitable material and having a window transparent to the beam. The reaction mixture may be irradiated statically or the mixture may be passed through a conduit having a window transparent to the beam so that it is irradiated in a flow system. In either case, provision should be made to remove a small amount of gas, generally mainly hydrogen, which may be formed during the radiation. Table I illustrates suitable windows and cell construction materials to be used with various types of radiation. The whole cell or conduit within the field of radiation may be made of the transparent material.

TABLE I

| Radiation | Cell Material | Window |
| --- | --- | --- |
| X or gamma | ¼″ Al, ⅒″ S.S. (or any other materials) | None needed. |
| Fast neutrons | Aluminum (or metals of low capture cross section). | Do. |
| Electrons | Any | Thin aluminum foil, thin S.S. foil or other thin metals. |

One of the preferred means of exposure, due particularly to the relatively low cost of the treatment, comprises placing of suitably canned spent fuel elements (removed from nuclear reactors) in a tank containing the monomers. An ordinary storage tank, properly shielded may be used, and the mixture of monomers should be circulated so as to effect uniform exposure to the spent fuel elements.

In effecting radiation, the feed mixture may be introduced into the interior of a reactor, as, for example, in a well designed reactor for that purpose or through a cooling tube or tubes.

The mixtures to be treated may be introduced into the reactor or into the path of the fast neutron or high energy beam in a receptacle in the reactor or in the path of the beam and subjected to irradiation while they are substantially static.

The process of the invention may be used to copolymerize the bicyclo-[2.2.1]-2,5-heptadienes with one or more ethylenically unsaturated monomers, i.e., monomers containing a $>C=C<$ group and preferably a $CH_2=C<$ group. These monomers may possess one or more ethylenic groups and may be aliphatic, cycloaliphatic, aromatic or heterocyclic in structure. Particularly preferred monomers are those which can be polymerized by ionic polymerization, e.g., those that can be polymerized to greater than dimers by treatment with $AlCl_3$ at low temperature, e.g., $-10°$ C. to $-90°$ C. Examples of such monomers include, among others, isobutylene, isoamylene, styrene, vinyl acetate, alpha-methylstyrene, dichlorostyrene, methoxystyrene, isoprene, butadiene, methyl pentadiene, methyl methacrylate, vinyl chloride, methacrylonitrile, vinyl alkyl ethers, as vinyl butyl ether, vinyl ketones, as vinyl butyl ketones, ethyl acrylate, allyl acetate, acrylonitrile and the like. Especially preferred monomers include the alpha-olefins and polyolefins containing up to 8 carbon atoms, the alkyl, chloro- and alkoxy-substituted styrenes and the acrylate esters.

Preferable copolymers are those containing from 10% to 99% by weight of a bicyclo-[2.2.1]-2,5-heptadiene and the remainder being a copolymerizable ethylenically unsaturated monomer.

The linear polymers prepared by the process will be of relatively high molecular weight and soluble in a number of aromatic solvents, as well as others, for example, carbon tetrachloride, chloroform, and cyclohexane, but not cyclopentane. The molecular weights of the products will preferably vary from about 10,000 to 1,000,000 or higher as determined by the light scattering technique.

The polymers are thermoplastic, i.e., melt on heating. The polymers generally melt at temperatures above 300° C. Because of the aforementioned unusual properties, the polymers are particularly suited for applications as surface coatings, impregnating agents, and can be molded to form attractive plastic materials.

The following examples illustrate the present invention. It is to be understood that the examples are for the purpose of illustration and the invention is not to be regarded as limited to any of the specific compounds or conditions recited therein. Unless otherwise specified, parts and percentages disclosed in the examples are by weight.

*Example I*

Freshly purified bicyclo-[2.2.1]-2,5-heptadiene (96.4 g.) was distilled under reduced pressure directly into the circulating cell described by Wagner in Journal of Physical Chemistry 64, 231 (1960), and placed under a helium atmosphere. Ice water was circulated through the cooling jacket. At the same time the diene was circulated past the aluminum window where it was irradiated for 19 minutes with 3 mev. electrons attenuated to 24 micro amps. The calculated dose was $7 \times 10^7$ rads based on predetermined dosimetry experiments. The maximum temperature was 20° C. during irradiation. The volatile components were then removed and the residue dissolved in warm cyclohexane and precipitated with petroleum ether. The resulting dried white amorphous polymer weighed 29.3 g. (30.4% conversion). The polymer exhibited a melting point of greater than 300° C. and showed only slight sintering on prolonged heating at this temperature. The polymerization G value was 60.

A calculated $(C_7H_8)_n$ content would indicate 91.25% carbon and 8.75% hydrogen. Actual analysis indicated that the carbon content was 90.67% and hydrogen content was 8.96.

*Example II*

When Example I is repeated using 2-methyl-bicyclo-[2.2.1]-2,5-heptadiene as the monomer, a white amorphous polymer soluble in aromatic hydrocarbon solvents having good thermal stability is produced.

*Example III*

Freshly purified bicyclo-[2.2.1]-2,5-heptadiene (30.0 g.) was sealed in an ampoule under reduced pressure in the absence of oxygen by alternate freezing and thawing under high vacuum. The ampoule and contents were then rotated in a constant temperature bath at −80° C. and irradiated with X-rays generated from Van de Graaf electrons impinging on a gold target. The diene was exposed to a total dose of $1.7 \times 10^7$ rads as determined by previous dosimetry. The polymer was precipitated at room temperature with n-pentane, collected, washed and dried. The polymer had a molecular weight of 320,000 as determined by the light scattering technique. A 34% conversion yielded 10.2 grams of polymer. The G value of the polymerization was 204.

The purified polymer was dissolved in benzene and applied to a metal plate. The resulting surface coating remained stable upon heating to 300° C. thereby exhibiting good thermal stability and heat resistance.

*Example IV*

When the polymerization process of Example I is repeated wherein 5% of the bicyclo-[2.2.1]-2,5-heptadiene is replaced by isobutylene, a soluble high-melting copolymer is obtained.

*Example V*

When the polymerization process of Example I is substantially repeated with the exception that 5% of the bicyclo-[2.2.1]-2,5-heptadiene is replaced by styrene, a soluble high-melting copolymer is obtained.

I claim as my invention:

1. Solid thermoplastic saturated homopolymers of a bicyclo-[2.2.1]-2,5-heptadiene which are soluble in aromatic and chlorinated solvents and consisting of repeating units selected from the group consisting of nortricyclene and alkyl-substituted nortricyclene units.

2. Solid thermoplastic saturated homopolymers of an alkyl-substituted bicyclo-[2.2.1]-2,5-heptadiene which are soluble in aromatic and chlorinated solvents and consisting of repeating alkyl-substituted nortricyclene units.

3. Solid thermoplastic saturated homopolymers of a 2-alkyl-substituted bicyclo-[2.2.1]-2,5-heptadiene which are soluble in aromatic and chlorinated solvents and consisting of repeating alkyl-substituted nortricyclene units.

4. Solid thermoplastic saturated homopolymers of bicyclo-[2.2.1]-2,5-heptadiene which are soluble in aromatic and chlorinated solvents and consisting of repeating nortricyclene units.

5. A process for polymerizing a bicyclo-[2.2.1]-2,5-heptadiene to form solid thermoplastic saturated homopolymers soluble in aromatic and chlorinated solvents and which consist of repeating units selected from the group consisting of nortricyclene and alkyl-substituted nortricyclene units which comprises exposing the diene to from $10^4$ to $10^8$ rads of high energy ionizing radiation.

6. A process as in claim 5 wherein the diene is exposed to an electron beam.

7. A process as in claim 5 wherein the diene is exposed to X-rays.

8. A process as in claim 5 wherein the diene is an alkyl-substituted bicyclo-[2.2.1]-2,5-heptadiene.

9. A process as in claim 5 wherein the diene is bicyclo-[2.2.1]-2,5-heptadiene.

10. A process as in claim 5 wherein the polymerization is performed at a temperature between −180° C. and 30° C. in the presence of an inert atmosphere.

11. A solid thermoplastic saturated copolymer, soluble in aromatic and chlorinated solvents, of a bicyclo-[2.2.1]-2,5-heptadiene and a dissimilar monomer selected from the group consisting of alpha-olefins containing up to 8 carbon atoms, alkyl-, chloro-, and alkoxy-substituted styrenes and acrylate esters, said copolymer consisting of (1) units selected from the group consisting of nortricyclene and alkyl-substituted nortricyclene units and (2) units of said dissimilar monomer.

References Cited in the file of this patent

UNITED STATES PATENTS

| | | |
|---|---|---|
| 2,932,630 | Robinson et al. | Apr. 12, 1960 |
| 2,996,441 | Nelson et al. | Aug. 15, 1961 |
| 3,012,950 | Anderson | Dec. 12, 1961 |

FOREIGN PATENTS

| | | |
|---|---|---|
| 228,056 | Australia | May 2, 1960 |
| 701,211 | Great Britain | Dec. 23, 1953 |